United States Patent

Schaper et al.

[11] Patent Number: 5,829,827
[45] Date of Patent: Nov. 3, 1998

[54] PASSENGER SEAT WITH LATERAL IMPACT PROTECTION

[75] Inventors: Dieter Schaper, Eisenhofen; Josef Mayer, Unterschleissheim, both of Germany

[73] Assignee: Autoliv Development AB, Vargarda, Sweden

[21] Appl. No.: 541,646

[22] Filed: Oct. 10, 1995

[30] Foreign Application Priority Data

Oct. 10, 1994 [DE] Germany ............ 44 36 139.4

[51] Int. Cl.$^6$ ...................................... B60N 2/42
[52] U.S. Cl. ........................................ 297/216.1
[58] Field of Search ............... 297/216.1, 216.13, 297/216.15, DIG. 3, 452.41, 378.1, 354.12, 354.1, 464; 280/730.2

[56] References Cited

U.S. PATENT DOCUMENTS

| 3,623,768 | 11/1971 | Capener ............... 280/730.2 X |
| 3,888,503 | 6/1975 | Hamilton . |
| 4,946,191 | 8/1990 | Putsch ............... 297/DIG. 3 X |
| 5,052,065 | 10/1991 | West ............... 280/730.2 X |
| 5,251,931 | 10/1993 | Semchena et al. ....... 297/216.1 X |
| 5,277,441 | 1/1994 | Sinnhuber ............ 297/216.1 X |
| 5,348,342 | 9/1994 | Haland et al. ......... 280/730.2 |
| 5,464,246 | 11/1995 | Castro el a. .......... 297/216.1 R |
| 5,499,840 | 3/1996 | Nakano ............... 280/730.2 X |

FOREIGN PATENT DOCUMENTS

| 4019596 | 1/1992 | Germany ............ 280/730 A |
| 3281455 | 12/1991 | Japan . |
| 4050052 | 2/1992 | Japan ............... 280/730 A |
| 4166452 | 6/1992 | Japan ............... 280/730 A |
| 4356246 | 12/1992 | Japan ............... 280/730 A |
| 2232936 | 1/1991 | United Kingdom . |
| 9419215 | 9/1994 | WIPO . |

*Primary Examiner*—Milton Nelson, Jr.
*Attorney, Agent, or Firm*—Robert W. Becker & Associates

[57] ABSTRACT

A passenger seat for motor vehicle has a seat member and a backrest. A first side air bag is integrated into the seat member and the backrest for lateral impact protection in an accident. Upon activation the first side air bag is inflated and emerges from the seat member and the backrest so as to bridge laterally the space between the seat member and the backrest. The first side air bag is a hose having an initial diameter and an initial length, wherein upon inflation the initial diameter increases and the initial length shortens. The hose is connected with a first end to a fastening point at a forward portion of seat member and with a second end to a fastening point at an upper portion of the backrest.

6 Claims, 2 Drawing Sheets

PASSENGER SEAT WITH LATERAL IMPACT PROTECTION

BACKGROUND OF THE INVENTION

The present invention relates to a passenger seat, particularly for motor vehicles, with a side air bag that is integrated into the passenger seat at least on one side thereof and emerges due to inflation from the seat contour to bridge laterally the space between the seat member and the backrest.

A generic passenger seat is described in GBB-2 232 936. In the case of the known passenger seat, a side air bag inflatable upon actuation is mounted within the backrest. It emerges on inflation laterally from the seat back and stretches, when fully inflated, forwardly in the direction of the seat member of the passenger seat, as well as upwardly to the level of the head of the restrained passenger so that the inflated side air bag is positioned between the body of the passenger restrained on the passenger seat and, for example, the door of the respective vehicle. It thus reduces the possible injuries of a lateral impact for the restrained person.

The known passenger seat provided with a side air bag has the disadvantage that the side air bag requires a relatively large volume in order to protect the entire body of the restrained passenger from the side. Thus, the installation of the side air bag with a gas generator having a sufficient gas capacity is costly. Another disadvantage is that the side air bag emerging laterally from the backrest is unstable and yields to a load in the lengthwise direction of the vehicle.

It is, therefore, an object of the present invention to provide a passenger seat having the above-mentioned features with a side air bag that is of a simple design and easy to mount.

SUMMARY OF THE INVENTION

The passenger seat for motor vehicles according to the present invention is primarily characterized by:
  a seat member and a backrest;
  a first side air bag integrated into the seat member and the backrest for lateral impact protection in an accident, wherein upon activation the first side air bag is inflated and emerges from the seat member and the backrest so as to bridge laterally the space between the seat portion and the backrest;
  the first side air bag being a hose having an initial diameter and an initial length, wherein upon inflation the initial diameter increases and the initial length shortens; and
  the hose connected with a first end to a fastening point at a forward portion of the seat member and with a second end to a fastening point at an upper portion of the backrest.

Preferably, the passenger seat further comprises a pivot for pivotably connecting the backrest to the seat member. The hose is guided about the pivot a side thereof remote from the seat member.

Advantageously, one of the fastening points is displaceable along the initial length of the hose.

Expediently, the fastening point of the seat member is displaceable. The passenger seat in this embodiment further comprises a guide at the forward portion, wherein the fastening point is guided in the guide such that the fastening point of the seat member follows pivoting movements of the back rest.

The passenger seat preferably further comprises a spring connected between the fastening point at the seat member and the first end of the hose.

In yet another embodiment of the present invention, the passenger seat further comprises a casing connected laterally to the seat member and the backrest, wherein the hose is contained in the casing.

The hose can be located on a side of the passenger seat adjacent to the vehicle door or on a side of the passenger seat remote to the vehicle door.

The passenger seat may also further comprise a seat belt comprising a lap belt, wherein the hose is positioned such that, when inflated, the hose is located between the lap belt and a passenger seated in the passenger seat.

The passenger seat may also comprise a second side air bag identical to the first side air bag, wherein each side of the passenger seat is provided with one side air bag.

The hose may be divided into a plurality of hose sections having different inflation volumes.

The invention suggests in its basic idea that the side air bag is embodied as a hose that is reduced on inflating in its length due to the enlargement of its diameter. In its mounted position the air bag is attached with one end to the forward portion of the seat member and with its other end to the upper portion of the backrest. This arrangement has the advantage that only a relatively narrow (small diameter) air bag in its not inflated state has to be integrated into the body of the passenger seat. Because of the fastening points at the backrest and at the seat member and due to the resulting reduction in length on inflating, the air bag forms a tubelike, diagonal lateral connection between the backrest and the seat member for safely holding and protecting the body of the restrained person in the thorax and pelvis areas from the side since the resulting connection between backrest and seat member formed by the air bag is also able to absorb respective forces. In its mounted position the air bag is attached with one end to the forward portion of the seat member and with its other end to the upper portion of the backrest.

In order to avoid any influence on the side air bag being mounted at the passenger seat by a change of the incline of the backrest relative to the seat member, one embodiment of the invention suggests that the side air bag, following the seat contour, is guided (in its geometric arrangement relative to the passenger seat) the pivot connecting the backrest and the seat member. The hose may be held in position by a separate casing or integrated into the upholstry and in both cases is held in place by securing means that will break when the air bag is actuated and inflated. With such a geometric arrangement, an adjustment of the backrest in its incline relative to the seat member has no influence since no lengthwise change occurs in the area of the mounted hose. Therefore, no length adjustment is required for a backrest adjustment.

According to another embodiment of the invention it is suggested that one of the two attachment elements (fastening points) for the hose at the backrest and at the seat member are displaceable in the direction of the extension of the hose. Thus, a length adjustment is possible also in those cases in which the hose is not guided about the pivot connecting the backrest and the seat member. In addition, and maybe even more importantly, the possible length adjustment due to the possibility to displace one of the two attachment elements ensures that the air bag, when being inflated, can always, regardless of the position of the backrest relative to the seat member, reach a position in which it is fully inflated due to its length reduction upon inflation.

Alternatively, for the length adjustment a spring element that makes the length adjustment possible can be provided between one of the ends of the hose and the corresponding attachment element.

A further embodiment of the invention suggests that the hose is arranged within a casing that is mounted on the side of the passenger seat and comprises a portion correlated to the seat member and a portion correlated to the backrest. This casing has the advantage that also passenger seats can be retrofitted with the inventive side air bag by simply laterally connecting this casing to the passenger seat. Additionally, the mechanism for length adjustment, on the one hand, for the actual mounting of the hose and, on the other hand, for its optimum diagonal position on inflation can be integrated therein.

According to alternative embodiments of the invention, both sides of the passenger seat or only respectively one side of the passenger seat can be equipped with a side air bag. This prevents that, in situations in which the passenger is seated on the side remote from the side impact, the upper part of his body is rotated out of the three-point seat belt.

According to one embodiment of the invention it is suggested that the side air bag is positioned in its inflated state between the seat belt buckle, respectively, the lap belt and the body, so that the soft body parts are accordingly protected by the side air bag.

According to an embodiment of the invention it can be provided that the hose is divided into a plurality of hose sections having different inflation volumes, as is basically described for a seat belt in U.S. Pat. No. 3,888,503.

BRIEF DESCRIPTION OF THE DRAWINGS

The objects and advantages of the present invention will appear more clearly from the following specification in conjunction with the accompanying schematic drawings, in which.

DESCRIPTION OF PREFERRED EMBODIMENTS

Figure 1:
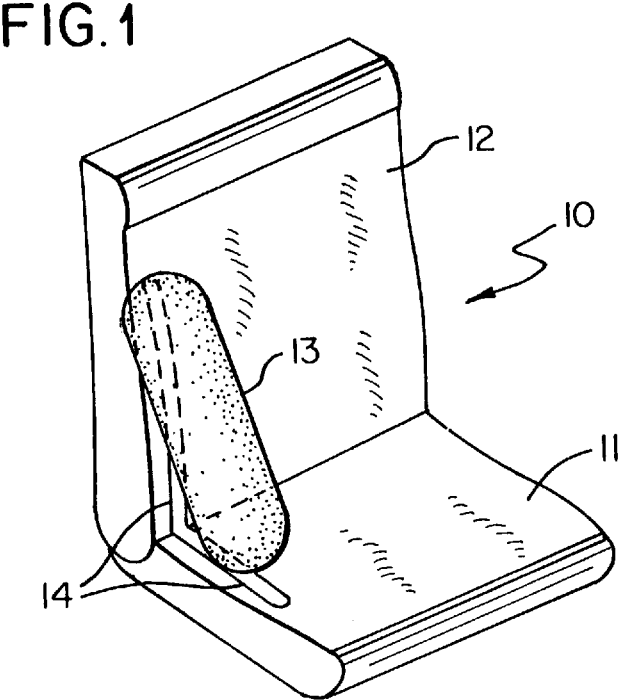
FIG. 1 is a schematic illustration of a passenger seat with an inflated air bag in a perspective view.

FIG. 1 illustrates a passenger seat 10 with a seat member 11 and a backrest 12. A hose 13 as a side air bag is illustrated in an inflated state. It emerged from its integrated position within the passenger seat on being inflated whereby the break point seams 14 within the seat 11, respectively, the seat back 12 have been torn open. The schematic illustration shows that the length of the hose defined by its mounted position is shortened due to the enlargement of the diameter of the air bag when it is inflated and that it thus forms a lateral diagonal delimitation of the seat member of the passenger seat and thus protects the body of the restrained passenger from the side.

Figure 2:
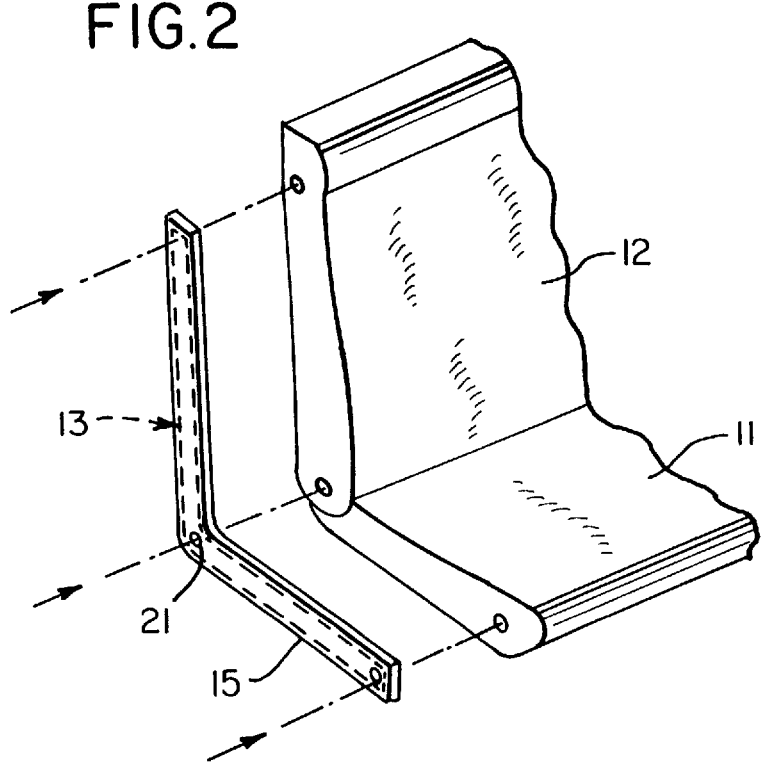
FIG. 2 is a perspective view of a passenger seat with a casing to be mounted to the passenger seat for receiving the air bag.

FIG. 2 illustrates a mounting possibility with which the hose 13 is integrated in a casing 15 the contours of which correspond to the contour of the passenger seat with its seat member 11 and backrest 12 so that the casing 15 can be laterally mounted to the passenger seat 10. In the area of articulation between the backrest and the seat member the casing 15 is provided with a pivot 21 so that the casing 15 can adjust to the respective position of the seat. In the case of an impact, the hose 13 being embedded in the casing 15 emerges from the space between the casing 15 and the passenger seat 10 and reaches a diagonally stretched position illustrated in FIG. 1 to secure the restrained passenger.

Figure 3:
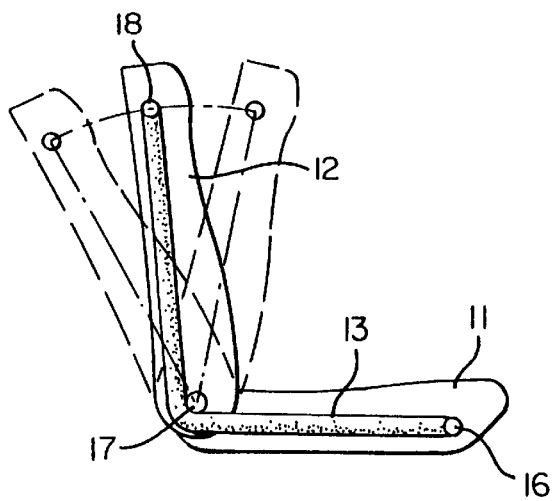
FIG. 3 is a schematic side view of a passenger seat with the air bag in its mounted position.

FIG. 3 illustrates the mounted position of the air bag 13 in the initial uninflated state, being attached with one end to an attachment element 16 at the forward portion of the seat 11 and with the other end to a further attachment element 18 at the upper portion of the backrest 12. The hose 13 is guided about the pivot 17 of the backrest 12 remote from the seat member 11. On adjusting the backrest about the pivot 17, it is not necessary to adjust the length of the hose since a change with regard to the length does not take place. This is illustrated by the alternative positions of the backrest 12 relative to the seat member 11 shown in dashed lines.

Figure 4:
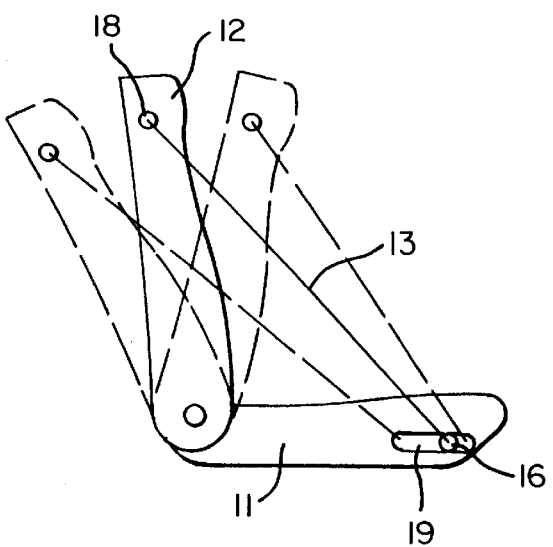
FIG. 4 illustrates the passenger seat with the air bag being inflated and with a displaceable arrangement of the fastening point for the air bag at the seat member.

Since the inflated hose 13, as illustrated in FIG. 1, has a shorter and generally fixed length relative to its mounted position, for each individual passenger seat the distance between the attachment element 18 at the backrest 12 and the attachment element 16 at the seat member 11 should correspond to the fixed length of the inflated air bag (hose) 13. This distance, however, depends on the position of the backrest 12 relative to the seat member 11, as is illustrated by the alternative positions shown in dashed lines of backrest 12, respectively, hose 13. Thus, in order to achieve the necessary adjustment in length for the inflated air bag 13, the attachment element 16 at the forward portion of the seat 11 is designed in the embodiment illustrated in FIG. 4 to be displaceable within a corresponding lateral guide 19 so that the attachment element 16 can adjust its position upon inflation of the air bag 13 according to the maximum length of the inflated air bag 13, depending on the position of the backrest 12 relative to the seat member 11.

Figure 5:
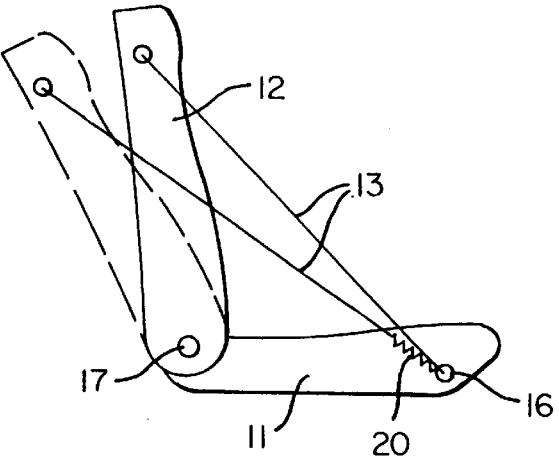
FIG. 5 is a further embodiment according to FIG. 4 with a spring element provided between the air bag and the seat member.

FIG. 5 illustrates another embodiment of a possible design for the length adjustment, namely in the form of a spring element 20 that is arranged between the end of the hose 13 facing the seat member and the attachment element 16 connected to the seat member 11. By this means it is also ensured that upon inflation of the air bag 13, it can reach its stretched position depending on the position of the backrest 12 relative to the seat member 11.

As is disclosed in the above illustration and description of the invention, the side air bag, being mounted on the side of the passenger seat, can be mounted to the passenger seat with length adjustment as well as without. No length adjustment is, for example, required for seats that do not provide the possibility of adjusting the backrest, as is the case particularly with the back seats of motor vehicles. In case that a length adjustment is provided, this length adjustment relates, on the one hand, to the recognition of the change in length of the mounted hose 13 when the inclination of the backrest is changed relative to the seat member as well as to the possible length of the inflated air bag 13 between its two attachment elements, depending on the amount of inflation. The side air bag can, in particular, also be mounted on back seats in driving direction on the left hand side as well as on the right hand side adjacent to the respective door, and also respectively between the passengers in order to guarantee the best protection possible.

The present invention is, of course, in no way restricted to the specific disclosure of the specification and drawings, but also encompasses any modifications within the scope of the appended claims.

What we claim is:

1. A passenger seat for motor vehicles, said passenger seat comprising:

a seat member and a backrest:

a first side air bag integrated into said seat member and said backrest for lateral impact protection in an accident, said first side air bag comprising a means for inflating, wherein upon activation of said means for Inflating said first side air bag is inflated and emerges from said seat member and said backrest so as to bridge laterally a space between said seat member and said backrest;

said first side air bag being a hose having an initial diameter and an initial length a direction of initial longitudinal extension, wherein upon inflation said initial diameter increases and said initial length shortens;

said hose connected with a first end to a fastening point at forward portion of said seat member and with a second end to a fastening point at an upper portion of said backrest;

wherein said fastening point of said seat member is displaceable in said direction of initial longitudinal extension of said hose;

a guide at said forward portion, wherein said fastening point of said seat member is guided in said guide such that said fastening point of said seat member follows pivoting movements of said back rest.

2. A passenger seat according to claim 1, further comprising a pivot for pivotably connecting said backrest to said seat member wherein said hose is guided about said pivot at a side thereof remote from said seat member.

3. A passenger seat according to claim 1, wherein said seat member and said backrest comprise a lateral casing for receiving said hose.

4. A passenger seat for motor vehicles, said passenger seat comprising:

a seat member and a backrest;

a first side a integrated into said seat member and said backrest for lateral impact protection in an accident, said first side air bag comprising a means for inflating, wherein upon activation of said means for inflating said first side air bag is inflated and emerges from said seat member and said backrest so as to bridge laterally a space between said seat member and said backrest;

said first side air bag being a hose having an initial diameter and an initial length in a direction of initial longitudinal extension, wherein upon inflation said initial diameter increases and said initial length shortens;

said hose connected With a first end to a fastening point at a forward portion of said seat member and with a second end to a fastening point at an upper portion of said backrest; and a spring connected between said fastening point at said seat member and said first end of said hose.

5. A passenger seat according to claim 4, wherein said seat member and said backrest comprise a lateral casing for receiving said hose.

6. A passenger seat according to claim 4, further comprising a pivot for pivotably connecting said backrest to said seat member, wherein said hose is guided about said pivot at a side thereof remote from said seat member.

* * * * *